United States Patent
Noble et al.

(10) Patent No.: US 6,735,678 B2
(45) Date of Patent: May 11, 2004

(54) METHOD AND APPARATUS FOR DISC DRIVE DEFRAGMENTATION

(75) Inventors: Gayle L. Noble, Boulder Creek, CA (US); Rick S. Shimizu, San Jose, CA (US); Jason P. Hanlon, Scotts Valley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 358 days.

(21) Appl. No.: 09/865,927

(22) Filed: May 24, 2001

(65) Prior Publication Data

US 2001/0047451 A1 Nov. 29, 2001

Related U.S. Application Data

(60) Provisional application No. 60/206,748, filed on May 24, 2000.

(51) Int. Cl.$^7$ .............................................. G06F 12/04
(52) U.S. Cl. ..................... 711/165; 711/111; 711/112; 711/170; 711/173
(58) Field of Search ........................ 711/111, 112, 165, 711/170, 173

(56) References Cited

U.S. PATENT DOCUMENTS

| 5,574,907 A | * | 11/1996 | Jernigan et al. ................ 707/1 |
| 5,930,828 A | * | 7/1999 | Jensen et al. ................ 711/170 |
| 5,956,745 A | * | 9/1999 | Bradford et al. ............. 711/137 |
| 6,202,121 B1 | * | 3/2001 | Walsh et al. ................ 711/100 |
| 6,397,311 B1 | * | 5/2002 | Capps ......................... 711/165 |

FOREIGN PATENT DOCUMENTS

| EP | 1 139 211 A2 | * | 4/2001 | ............. G06F/3/06 |

* cited by examiner

*Primary Examiner*—T Nguyen
(74) *Attorney, Agent, or Firm*—Moser Patterson & Sheridan LLP

(57) ABSTRACT

Aspects of the invention include a method and apparatus to defragment data on a disc drive storage system by optimizing the available physical block address on a media into one or more contiguous physical block addresses then storing the fragmented data into the one or more contiguous block address. In one aspect, the disc drive uses a reserved area on the media to hold fragmented files during the defragmentation process. In another aspect, sectors of the media having faster access time are used to store defragmented files that have a higher incidence of access relative to other files on the media.

18 Claims, 6 Drawing Sheets

| sector0 | sector1 | sector2 | sector3 | sector4 | sector5 | sector6 |
|---|---|---|---|---|---|---|
| Reserved 1 PBA 0 head_0 | Reserved 2 PBA 1 | Reserved 3 PBA 2 | Reserved 4 PBA 3 | Reserved 5 PBA 4 | LBA 0 6 PBA 5 | LBA 1 7 PBA 6 |
| LBA 2 8 PBA 7 head_1 | LBA 3 9 PBA 8 | LBA 4 10 PBA 9 | LBA 5 11 PBA 10 | LBA 6 12 PBA 11 | LBA 7 13 PBA 12 | LBA 8 14 PBA 13 |
| LBA 9 15 PBA 14 head_2 | LBA 10 16 PBA 15 | LBA 11 17 PBA 16 | LBA 12 18 PBA 17 | LBA 13 19 PBA 18 | LBA 14 20 PBA 19 | LBA 15 21 PBA 20 |
| LBA 16 22 PBA 21 head_3 | LBA 17 23 PBA 22 | LBA 18 24 PBA 23 | LBA 19 25 PBA 24 | LBA 20 26 PBA 25 | LBA 21 27 PBA 26 | LBA 22 28 PBA 27 |
| LBA 23 29 PBA 28 head_4 | Bad 30 PBA 29 | Bad 31 PBA 30 | Bad 32 PBA 31 | LBA 24 33 PBA 32 | LBA 25 34 PBA 33 | LBA 26 35 PBA 34 |
| LBA 27 36 PBA 35 head_5 | LBA 28 37 PBA 36 | LBA 29 38 PBA 37 | LBA 30 39 PBA 38 | LBA 31 40 PBA 39 | LBA 32 41 PBA 40 | LBA 33 42 PBA 41 |
| LBA 34 43 PBA 42 head_6 | LBA 35 44 PBA 43 | LBA 36 45 PBA 44 | LBA 37 46 PBA 45 | LBA 38 47 PBA 46 | LBA 39 48 PBA 47 | LBA 40 49 PBA 48 |
| LBA 41 50 PBA 49 head_7 | LBA 42 51 PBA 50 | LBA 43 52 PBA 51 | LBA 44 53 PBA 52 | LBA 45 54 PBA 53 | LBA 46 55 PBA 54 | LBA 47 56 PBA 55 |

Figure 3

METHOD AND APPARATUS FOR DISC DRIVE DEFRAGMENTATION

CROSS-REFERENCE TO A RELATED APPLICATION

This invention is based on U.S. Provisional Patent Application Serial No. 60/206,748 filed May 24, 2000 entitled Drive Based Adaptive Defragmentation System filed in the name of Gayle L. Noble, Rick S. Shimizu, and Jason P. Hanlon. The priority of this provisional application is hereby claimed.

U.S. Patent application entitled "METHOD AND APPARATUS FOR A DISC DRIVE ADAPTIVE FILE SYSTEM", application number 09/865,280 filed on May 24, 2001, filed in the names of Gayle L. Noble, Rick S. Shimizu and Jason P. Hanlon is hereby incorporated herein by reference in its entirety.

BACKGROUND OF THE INVENTION

1. Field of the Invention

The invention generally relates to storing and retrieving data on a disc drive.

2. Background of the Related Art

Disc drives are capable of storing large amounts of digital data in a relatively small area. Disc drives store information on one or more recording media. The recording media conventionally takes the form of a circular storage disc, e.g., media, having a plurality of recording tracks. Conventional disc drives include a plurality of vertically aligned storage discs, each with at least one magnetic head for reading or writing information to the media. Typically, the magnetic head is attached to a positioner arm assembly that uses a motor to align the magnetic head above a selected track on the disc. The location of the magnetic head is typically determined by a disc controller that is given the position of a data area on the disc to read or write data. The precise location and movement of the head is typically accomplished by incorporating a closed-loop electromechanical servo system with a dedicated servo region, or regions, used to provide high speed or continuous feedback to the system to maintain accurate positioning of the data head.

Generally, data is stored on the media in data sectors within each recording track, i.e., a cylinder. As the media is generally round, the number of data sectors per each cylinder on the outer portion of the media is greater than the number of sectors found on cylinders located closer to the center portion of the media. The time needed to access and/or store data is known as the "seek time" and is generally a function of the response of the closed loop electromechanical servo system to move the magnetic head (s) from one data sector to another. Generally, the outer cylinders typically have faster access as the positioner arm moves less to read and write data.

Due to their large storage capacity relative to other forms of electronic digital data storage, disc drives are often used by electronic systems such as computers to permanently or semi-permanently store applications, e.g., software programs, data, etc. The amount of data stored on disc drives is a function of the media density, size, and number of medias used. The applications are generally stored as files that are then used by an end user, or users, to perform tasks such as word processing, calculations, and the like. To assist the applications in locating a file, conventional computer operating systems generally use a layered directory structure. The conventional layered directory structures usually have a main directory and then sub directories where the files are stored. For example, using the DOS operating system, a file named "xyz" may be given a logical location such as "c:/xyz" indicating that the file is located on the "c" drive at a root directory "/".

To allow an application to find and use files on the media, each file is given a different logical address location on the media by the computer operating system. Operating systems communicate with the disc drive using logical block addresses (LBA). When an application makes a request for a file from the operating system, the operating system uses the file name to look up the location in terms of a starting LBA and the number of LBAs needed to read or write the file. The LBA is then translated by internal disc drive software to the actual physical location on the disc drive, ie., the physical block address (PBA). The PBA may include a number of data sectors depending upon the translation scheme used on the media for storing data. The translation from LBA to PBA is necessary to allow the disc drive to implement a defect management scheme and to set aside reserved areas on the media for manufacturer specific data, disc drive operating firmware, and other data not generally accessible to the operating system.

As files are written to the drive, the files are allocated to available LBAs. Ideally, each file would be contiguous, i.e., be located in contiguous LBAs. However, due to the media defects, file deletion, and file sizes, the file may be split, i.e., fragmented, so that the sectors containing one file are not contiguous but are surrounded on both sides by sectors having data that belong to other files. Depending on the drives available space, file size, and the current file allocation the location of the fragmented file parts may be located randomly on the media. As seek times negatively impact file storage and retrieval times, increased file fragmentation degrades the application speed and efficiency as the head moves across the media seeking the file fragments. As files are modified by additions, deletions, defects, etc, the operating system maintains the new LBA locations of the data for each file often storing the location of the fragments within a "file header". To help minimize the impact of file fragmentation, most operating systems use a defragmentation process to "defragment" the files. The defragmentation process locates a fragmented file in terms of LBAs, and moves the fragmented file LBAs so that the LBAs are generally contiguous. Unfortunately, as the LBA blocks required may not fully utilize the available PBAs, the files may not be optimally defragmented thereby leaving unused PBAs segments, physically fragmenting the file. Fragmented PBAs may reduce the storage capacity of the media and increase seek times. Further, when run concurrently with other applications, the defragmentation process may negatively affect the performance e.g., speed, of the other applications. To overcome the defragmentation impact on system resources, defragmentation is often performed when other applications are not running. Still further, the operating system defragmentation relies upon available media space in terms of free LBAs. Therefore, for a media that is full, defragmentation may not be possible unless the user creates media space by moving or deleting files.

Thus, what is needed is a method that allows for effective defragmentation of a disc drive that may be run concurrently with applications without system resource degradation.

SUMMARY OF THE INVENTION

Aspects of the invention have particular advantages in electronic data storage systems. In one embodiment, the invention generally provides a method and apparatus for storing data to a disc drive, including determining the data storing size of one or more free contiguous physical block addresses, then determining the data size of a least one or more fragmented files, then if the data storing size of at least one contiguous physical block addresses is at least as large as the data size of at least one of the fragmented files, then writing at least one of the fragmented files to the contiguous physical block address where the total data size of the one or more fragmented files does not exceed the contiguous physical block address data storing size.

In another embodiment, the invention provides a method of storing data to a disc drive including combining at least two available physical block addresses into at least one contiguous physical block address, then locating at least one fragmented file to the at least one contiguous physical block addresses wherein the data storing size of the contiguous physical block address is at least as large as the at least one fragmented file, combining the fragmented file to form at least one contiguous file, and writing the at least one contiguous file to the at least one contiguous physical block address to form at least one contiguous defragmented file.

In still another embodiment, the invention provides a disc drive system including a signal-bearing media means for storing data, a code memory means coupled to a read/write controller means for controlling the reading and writing of data to the signal-bearing media, means for reading and writing the data to the signal-bearing media, and a processor means coupled to the code memory and the read/write controller for defragmenting the data on the signal-bearing media means.

BRIEF DESCRIPTION OF THE DRAWINGS

So that the manner in which the above recited features, advantages objects, and aspects of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

Other features and advantages of the invention will become apparent to a person of skill in this field who studies the following description of an embodiment given below in association with the following drawings.

FIG. 3 illustrates conventional storage locations on a media with respect to LBAs and PBAs.

DETAILED DESCRIPTION OF THE PREFERRED EMBODIMENT

Aspects of the invention have particular advantages in electronic data storage systems. One exemplary electronic data storage system commonly used in the computer industry, well suited for supporting the defragmentation method described herein, is known as a disc drive. As will be described below, aspects of the invention pertain to specific method steps implementable on computer disc-drive systems.

In one embodiment, the invention may be implemented as part of a computer program-product for use with computer disc-drive systems. The programs defining the functions of a preferred embodiment can be provided to the disc drive via a variety of signal-bearing media, which include but are not limited to, (i) information permanently stored on non-writeable storage media (e.g. read-only memory devices within a computer such as read only CD-ROM disks readable by a CD-ROM or DVD drive; (ii) alterable information stored on a writable storage media (e.g. floppy disks within diskette drive or hard-disc drive); or (iii) information conveyed to a computer by communications medium, such as through a computer or telephone network, including wireless communication. Such signal-bearing media, when carrying computer-readable instructions that direct the functions of aspects of the invention, represent alternative embodiments of the invention. It may also be noted that portions of the product program may be developed and implemented independently, but when combined together constitute embodiments of the invention.

Figure 1:
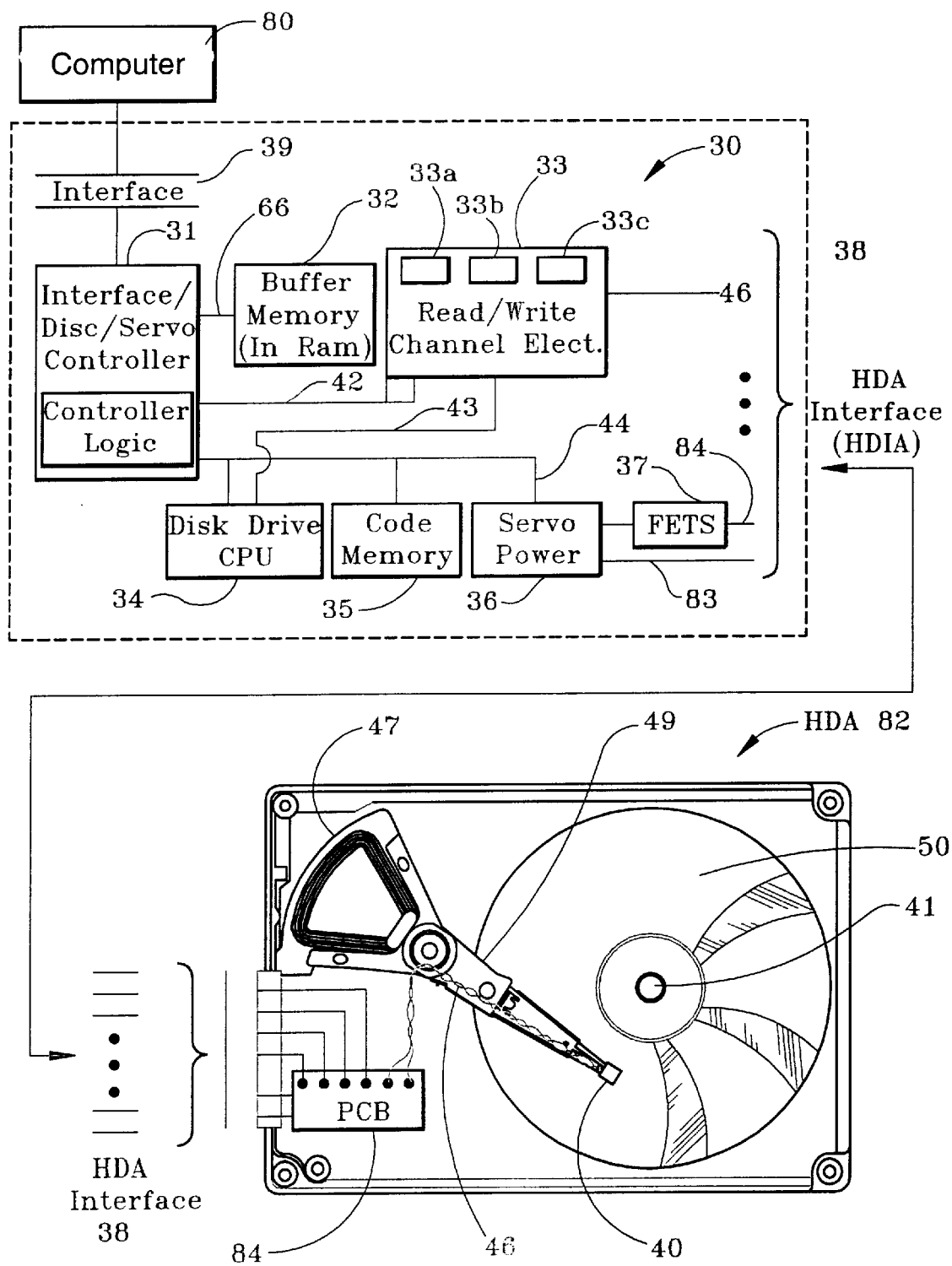
FIG. 1 is a plan view of a conventional disc-based apparatus for reading and writing data on a media wherein aspects of the invention may be used to advantage.

FIG. 1 is a plan view of a typical disc-based apparatus for reading and writing data on a media 50 wherein aspects of the invention may be used to advantage. FIG. 1 illustrates one embodiment of the invention including disc drive electronics 30 which in general includes an interface 39 adapted to receive external signals and data, and a Head Disc Assembly Interface (HDAI) 38 for connecting the disc drive electronics 30 to the head disc assembly (HD) 82. The HD 82 includes read/write transducer head(s) 40 coupled via wires 46 to the HDAI 38, a spindle motor 41, an actuator arm 49, a servo actuator 47, and other disc drive components that are well known in the art. The read/write transducer head(s) 40 are mounted on the actuator arm 49. As the servo actuator 47 moves the actuator arm 49, the read/write transducer head(s) 40 fly above the media 50 to read and write data to the media 50. The media 50 typically includes a disc or discs coated with a recording material such as ferrous iron, magneto-optical media, and other materials adapted to hold a magnetic charge. Media 50 may also include optical media such as a DVD adapted to optically store digital information.

The interface/disc/servo controller 31 provides a translation and command interface between a computer 80 and disc drive electronics 30 through the interface 39. The interface/disc/servo controller 31 is directly connected to the buffer memory 32 through a memory bus connection 66. The buffer memory 32 may store program code and/or data for use with the operation of the drive. Interface/disc/servo controller 31 is also connected via a read/write bus 44 to a CPU 34 used for processing the disc drive commands, a code memory 35 adapted to store operational data and commands, and the servo power electronics 36, adapted to operate the servomotor 41 and actuator arm 49. Servo power electronics 36 are typically connected to the HD 82 via servo control connection PCBA 84 to a plurality of FET switches 37 that control the spin motor 41. The HDAI 38 provides an electrical connection between the printed circuit board assembly (PCBA) 84 including the internal disc drive electronics 30, and the HD 82 including the disc drive internal mechanical and electromechanical components. Read/write channel electronics 33 used to transmit data to and from the media 50 include read write logic 33*a*, write logic 33*b*, and servo logic 33c, and includes a connection to the interface/disc/servo controller 31 through the data bus 42 and a connection to the read/write head(s) 40 through read/write line 46. A serial bus 43 is used to send configuration commands from the CPU 34 to the read/write channel electronics 33.

FIG. 1 is merely one hardware configuration for a disc-drive data storage system. Aspects of the invention can apply to any comparable hardware configuration, regardless of whether the disc-drive data storage apparatus is a complicated, multi-media storage apparatus including a plurality of media types, or a single disc-drive data storage apparatus.

Figure 2:
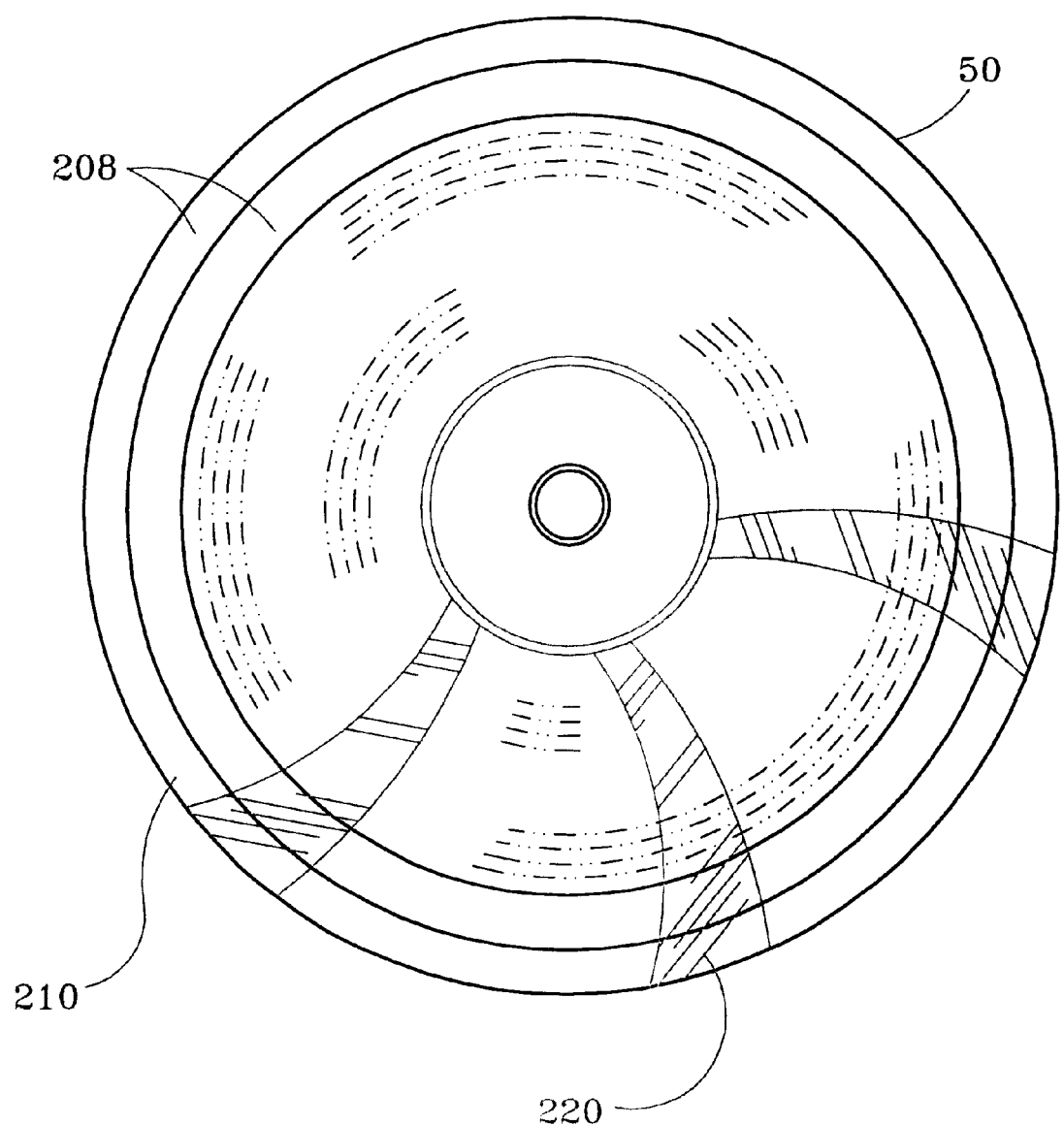
FIG. 2 is a plan view of conventional media for storing data wherein aspects of the invention may be used to advantage.

FIG. 2 is a plan view of the media 50 for storing data wherein the aspects of the invention may be used to advantage. FIG. 2 illustrates data storage tracks 208 on the media 50 including data wedges 210 separated by a plurality of servo wedges 220 in accordance with the invention. As necessary, FIG. 1 is referenced in the following discussion of FIG. 2. For clarity, only portions of the tracks 208 are shown. Illustratively, a plurality of the tracks 208 are shown representing a plurality of data wedges 210 and servo wedges 220 extending across the media 50 for data storage and retrieval by the read/write head(s) 40. As the read/write head(s) 40 fly over the media 50, the servo actuator 47 moves the actuator arm 49 and read/write head(s) 40 to a particular track 208 on the media 50 in response to commands from the interface/disc/servo controller 31. The data wedges 210 are generally used for storing external data from an external user such as multimedia files and are generally accessible by the user through the interface 39. Several adjacent tracks 208 can be combined together to create a "zone" of tracks 208 with similar data densities. The "zone" may represent several data wedges 210. Servo wedges 220 are portions of each track 208 that may include read/write head(s) alignment indicia, physical address information, and check pointing data used for defect management. Servo wedge data is generally for the drive use and is usually inaccessible to the outside user. The servo wedge 220 includes digital data that identifies the particular track 208 (e.g., cylinder) and the sector. The servo wedge also includes area(s) of precisely placed magnetic bursts where the relative amplitude when read from the read/write head(s) 40, indicates the position of the head 40 relative to the track center. Furthermore, additional fields may be written into the servo wedge 220 as desired by the manufacturer.

FIG. 3 illustrates data stored on a media 50 includes eight media surfaces each surface having a read/write head 40 and fifty six storage blocks. The read/write head 40 for the first media is denoted as read/write head zero, the second media has read/write head one, and so on. In this example, one cylinder i.e., one track 208, of each media surface will be considered. Obviously, every disc media surface, in actual operation, has hundreds of tracks. Each cylinder can hold seven data sectors sector zero through sector six. In this example, contiguous PBA blocks are located on a single media such as head 1 sector zero through six. Data communicated to and from a data storage system is normally managed by the logical block address (LBA) rather than by the physical block address (PBA). Data sectors are numbered blocks of data to be stored and retrieved. Data sectors are the fundamental units of data handled by the data storage system and are usually of fixed length, e.g., 512 bytes. In one aspect of the invention, one data sector equals the length of one data wedge 210. However, if the data wedges 210 are large, as is often the case with magnetic storage systems, several logical addressed data sectors may be stored in a single physical data wedge 210. In this example, ideally the media 50 would have fifty-five LBAs and fifty-five PBAs where each PBA would have an identical LBA. However, due to the media defects for PBAs thirty through thirty-two, and the reserved blocks one through five, only forty-seven LBAs are available to the operating system. The LBAs numbers are adjusted to conform to the available PBAs. For example, a physically fragmented file (i.e., file is located on fragmented PBAs blocks) may be viewed by the operating system as contiguous, spanning block twenty-nine through block thirty-five, with LBAs twenty-three through twenty-six, but due to the defect blocks thirty through thirty-two, PBA thirty-six, PBA thirty-seven, and PBA thirty-eight are not used leaving the file physically fragmented.

Figure 4:
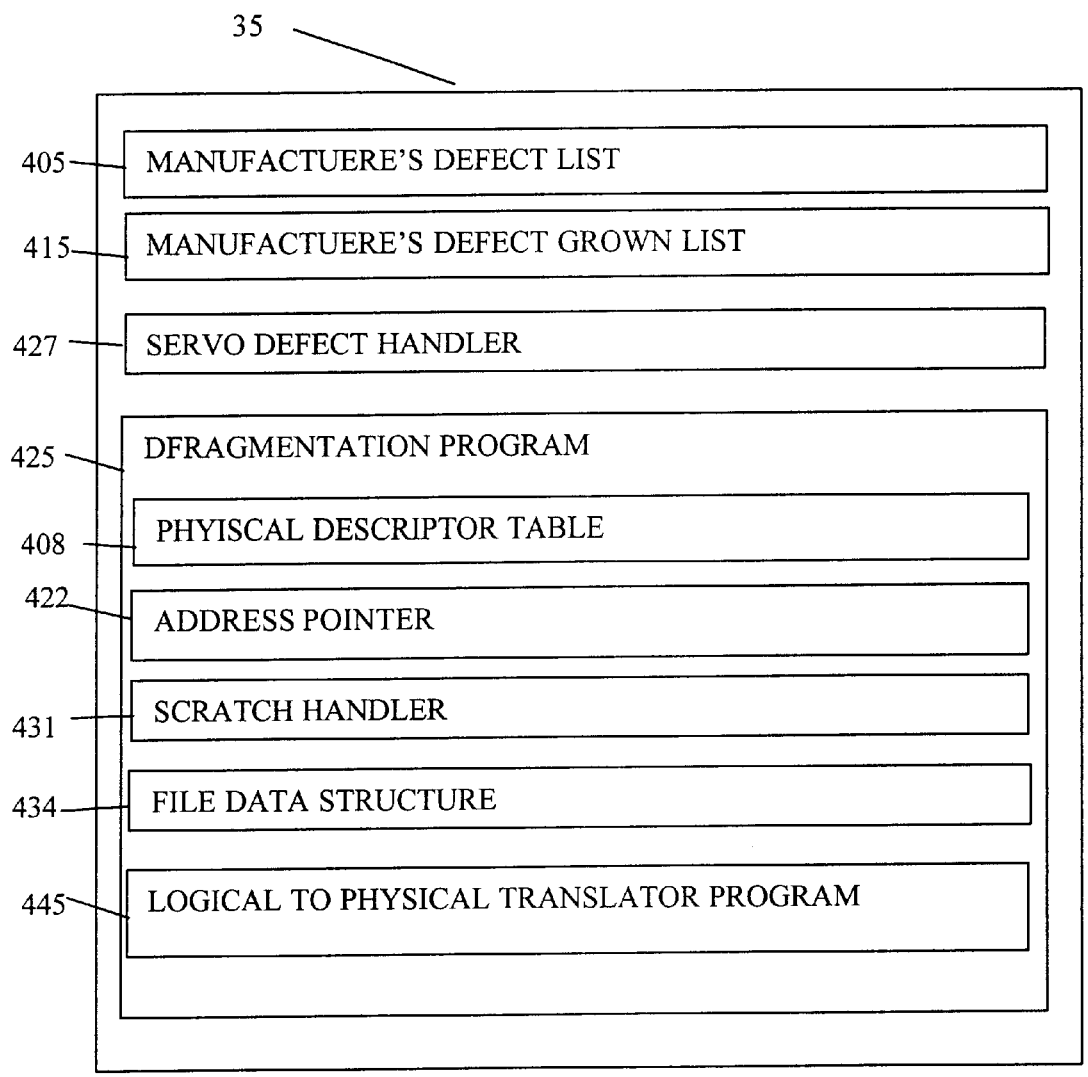
FIG. 4 illustrates a memory core for storing programming data in which aspects of the invention may be used to advantage.

FIG. 4 illustrates the code memory 35 for storing programming data in which embodiments of the invention may be used to advantage. The code memory 35 is preferably random access memory sufficiently large to hold the necessary programming and data structures of the invention. The code memory 35 may be used to store operating code, and other run-time code that enables the drive. For redundancy, the contents of the code memory 35 may also be stored to a plurality of reserved areas of the media 50 or into other areas of the drive electronics 30 such as buffer memory 32.

During manufacture, the recording media 50 is usually written to and then read back from to determine which PBAs are defective. Part of the process of converting a logical block address to a PBA on the media 50 includes storing two lists in code memory 35, a manufacturer's defect list 405, and a physical descriptor table 408. The physical descriptor table 408 generally includes servo data that indicates how many bytes of data may be written between each servo wedge 220 and may indicate if the servo wedge 220 is to be skipped. Additionally, the physical descriptor tables 405 may indicate that a zone needs to be skipped, as there may be a very large defect in the media 50 covering more than one data wedge 210 within a zone. The manufacture's defect list 405, i.e., drive defect list, maps the defect relationship between logical and physical addresses between the non-defective physical addresses and logical addresses, and is stored on the media 50 by the manufacture and loaded into the code memory 35 during operation. Additionally, as the media 50 is used, other defects may occur through, for example, the read/write head(s) 40 inadvertently touching the surface of the media 50 during a read and/or write operation, physically damaging one or more data sectors on the media 50. Media defects subsequent to the manufacturer's defect list 405 are placed in the manufacturer's defect grown list 415. Thus, the manufacturer's defect grown list 415 literally "grows" as the media 50 is used.

The code memory 35 further includes a logical to physical translation program 445 adapted to translate the LBA to the physical data location on the media 50 i.e., the PBA. The physical translation program 445 coordinates the translation of the logical address of a particular block of data to the physical address of the location at which the data is stored. The logical to physical translator program 445 uses the physical descriptor table 408, the manufacturer's defect list 405, and manufacturer's defect grown list 415 to determine if the requested sector(s) have moved. The code memory 35 also includes an address pointer 422 used to point the logical to physical translation program 445 to the physical descriptor table 408. The code memory 35 further includes a servo defect handler code 427 used to manage defective servo wedges 220. The data written after a defective servo wedge is generally unreliable. Therefore, the servo defect handler code 427 allows the disc drive to skip defective servo wedges 220 when needed.

The code memory 35 further includes a defragmentation program 425. The defragmentation program is adapted to optimize the available, e.g., empty, PBAs, and defragment fragmented files on the media 50. In one aspect, the defragmentation program uses a scratch handler program 431 to write files to reserved areas on the media 50 during a defragmentation process described below. In another aspect, the fragmented files are relocated to contiguous PBA sectors during the defragmentation process. In still another aspect, the defragmentation program moves the files on the media 50 up or down in PBA number so that each file is adjacent creating one or more contiguous PBA either at the end or the beginning of the usable PBA locations.

In another aspect, the defragmentation program uses a file data structure 434 to establish the LBA locations of the files. The file locations are then converted to PBA by the logical to physical translator program 445. The LBA locations may be obtained from the operating system as a copy of the file allocation table, or from a drive-based file system. In either case, the defragmentation program 425 uses the file data structure 434 to locate each file on the media 50 during the defragmentation process. As files are defragmented, the file data structure 434 is updated as described below to reflect the new file locations.

Although code memory 35 is shown as a single entity, it should be understood that code memory 35 may in fact may be volatile or non-volatile, comprise a plurality of modules, and that the code memory 35 may exist at multiple levels, from high speed registers and caches to lower speed but larger DRAM chips.

Figure 5:
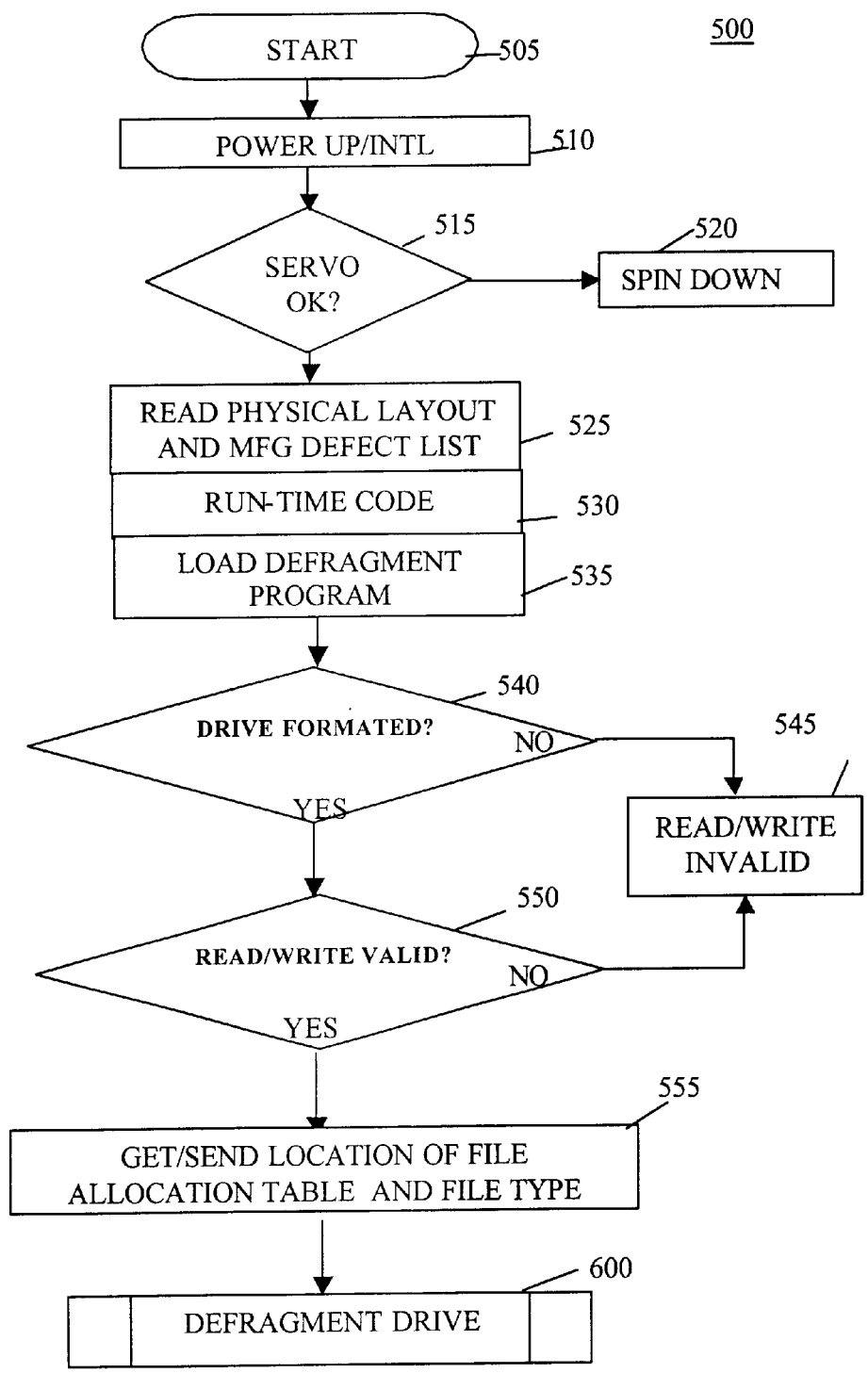
FIG. 5 is a flow diagram of a method for a start-up sequence for the disc-based apparatus of FIG. 1 in accordance with aspects of the invention.

FIG. 5 is a flow diagram of a method 500 for a start-up sequence for the disc-based apparatus of FIG. 1 in accordance with the invention. As necessary, FIGS. 1–4 are referenced in the following discussion of FIG. 5.

FIG. 5 is entered at step 505 when for example the computer 80 instructs the disc drive electronics 30 to read or write data to the media 50. At step 510, the interface/disc/servo controller 31 initializes the disc drive electronics 30, CPU 32, the code memory 35, the servo power 36, FETs 37, the read/write channel electronics 33, and the buffer memory 32 and begins the process of "spinning", i.e., rotating, the media 50 up to prepare the media 50 for a read or write operation. At step 515, the method 500 determines whether the servomotor 41 is functioning properly. If the servomotor 41 is working improperly, the servomotor 41 spins down at step 520. If the servomotor 41 is functioning properly, at 525 the actuator arm 49 positions the read/write transducer head(s) 40 and reads the manufacturer's defect list 405 and physical descriptor table 408 stored within a reserved area within memory and/or on the media 50 such as a reserved area on a servo wedge 220. At step 530, run-time code such as the address pointer 422, the servo defect handler 427, logical to physical translator program 445, and the like, are loaded into the code memory 35 from the media 50 and/or memory into a separate data location to allow the normal operation of the drive. At step 535, the defragmentation program 525 is loaded into code memory 35 from the media 50 and/or memory. At step 540, the media 50 is checked if it is properly formatted to receive data from the read/write transducer head(s) 40. If the media 50 is not properly formatted, then at 545, the read/write commands are set as invalid. If the read/write commands at step 550 were set to invalid from step 545, then the drive would be unable to be used for storing or retrieving data from the data wedges 210. If the media 50 is properly formatted, the method 500 proceeds to step 555 to get the file allocation table and file types either from the operating system or from the disc drive file system. Subsequently, method 500 then proceeds to defragment the media 50 at step 600.

Figure 6:
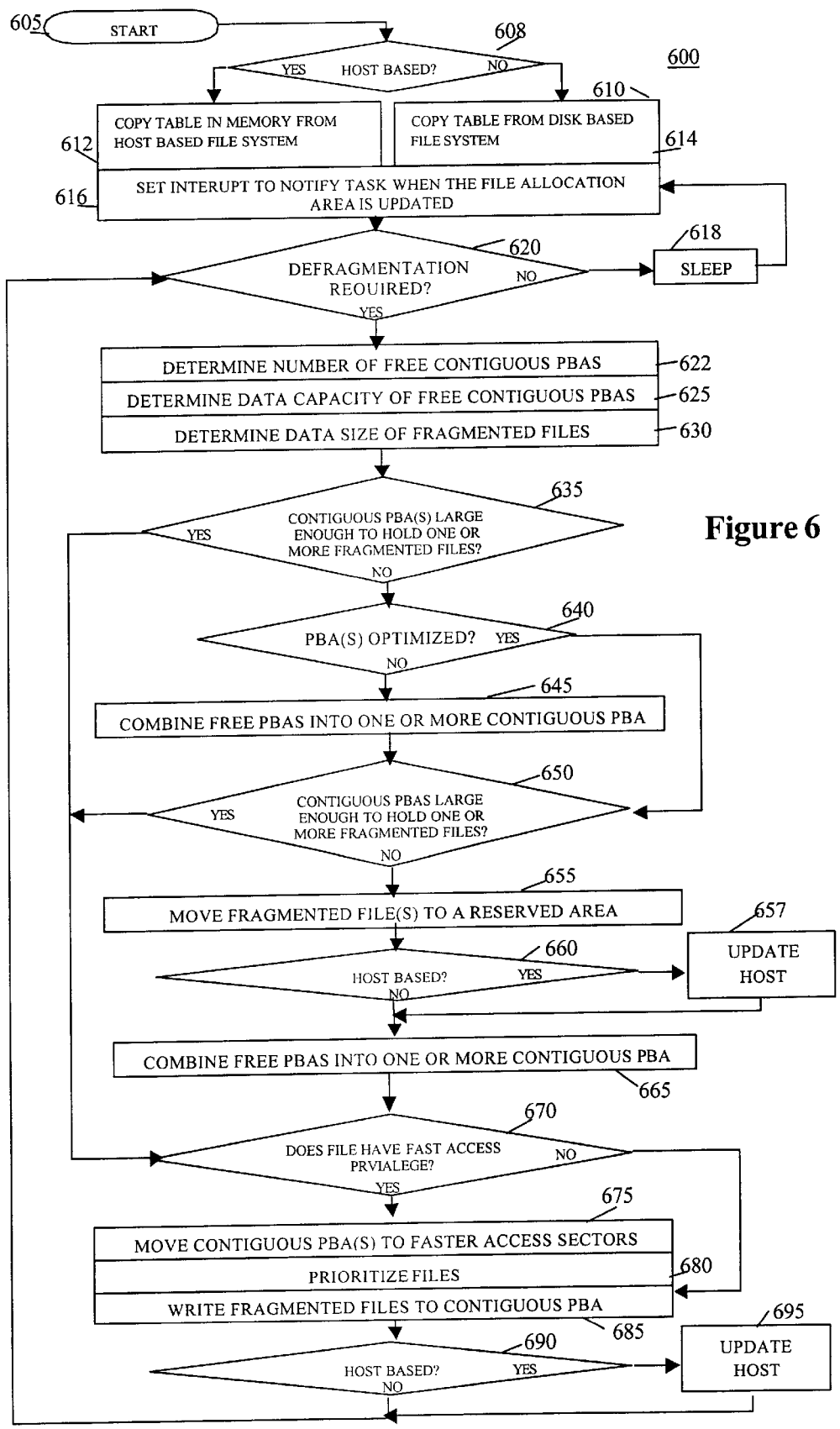
FIG. 6 is a flow diagram of a method of file defragmentation on a disc-based apparatus of FIG. 1 in accordance with aspects of the invention.

FIG. 6 is a flow diagram of a method 600 for a method of defragmenting data on the media 50 of FIGS. 1 and 2 in accordance with the invention. As necessary, FIGS. 1–5 are referenced in the following discussion of FIG. 6.

FIG. 6 is entered at step 605 when the defragmentation process is initiated from step 600. At step 608, the method 600 determines if the file allocation is provided by the operating system, i.e., host based, or from the disc drive's file system. If the file allocation is host based a copy of the file allocation table is copied from the media 50 into the file data structure 434. If the file allocation table is from the disc drive, a copy of the file allocation table placed by the disc-drive file system in memory and/or on the media 50 is copied to the file data structure 434. At step 616, an interrupt is set to detect a change in the file allocation tables when file locations are updated by the operating system, disc drive file system, and/or defragmentation program 425.

At step 620, the method 600 determines if disc drive defragmentation is necessary. In one aspect, disc drive defragmentation is defined as at least one fragmented file and/or at least one fragmented available (i.e., free) PBA. If the file does not require defragmentation, i.e., the drive is optimized, then method 600 is put on hold, e.g., to sleep, until defragmentation is required at step 618. The method 600 is reinitialized at step 616 upon detection of a file allocation change. If defragmentation is required, the number of free contiguous PBAs on the media 50, the data capacity of the free contiguous PBAs and the data size of each fragmented file is determined at step 622, step 625, and step 630 respectively.

At step 635, the method 600 determines if each contiguous PBA is large enough to hold one or more fragmented files without fragmenting the file into more than one contiguous PBA. If the each contiguous PBA is large enough to hold one or more fragmented files, then the method 600 proceeds to step 670 described below. If none of the contiguous PBAs is large enough to hold at least one of the fragmented files, then the contiguous PBAs are checked for optimization at step 640. The PBAs are optimum when all of the free PBAs form the fewest number of physically contiguous PBAs on the media 50. Ideally, one contiguous PBA is used to store the fragmented files but more than one contiguous PBA is contemplated. If the contiguous PBAs are optimum, then the method 600 proceeds to step 650 described below. If the contiguous PBAs are not optimal then the free contiguous PBAs are combined by the method 600 into one or more contiguous PBAs representing the available free space on the media 50.

At step 650, the contiguous PBAs are checked to see if they can hold one or more fragmented files. If they can hold one or more fragmented files, the method 600 proceeds to step 670 described below. If the contiguous PBAs cannot hold at least one fragmented file, then the method 600 writes a fragmented file to a reserved, e.g., scratch area at step 655, moving the address pointer 422, to point to the reserved area for file access. At step 660, the method determines if the file allocation was drive or host based. If host based, the host is flagged that the location of the file was moved to the reserved area. The free contiguous and none contiguous PBAs are combined into a minimum number of contiguous PBAs at step 665. In one aspect, the user may set the size of the reserved area depending upon the file type. For example, and audio and/or video file may require more reserved area than other data files.

At step 670, the method 600 determines if the file being defragmented has privileged, i.e. faster, file access. If the file has privileged access, the contiguous PBAs are moved to the sectors that have faster access times such as the outer sectors of the media 50. In one aspect, to move the contiguous PBAs to the faster sectors requires that files located within the faster sectors and free PBAs be swapped until the contiguous PBAs are located in the faster sectors. In another aspect, once the contiguous PBAs are located in the faster sectors, at step 680, the files are prioritized based on usage to give highly used files faster access relative to other files. In one aspect, the files are prioritized based on the relative number of accesses for each file. For example, consider the case of two files where one file has only one access and the second file has ten accesses. The second file is given priority to the other file as it has ten times more accesses. At step 685, the files are written to the contiguous PBAs. From step 670. If the file does not have privileged access, then file is written to the contiguous PBAs in any order at step 685. At step 690, for host based file allocation, the method 600 proceeds to step 695 and updates the host of the LBA changes for the new file locations setting the pointer 422 to point to the proper location. Subsequently, the method returns from either step 690 or 695 to step 620 to determine if the media 50 requires defragmentation.

In summary, aspects of the invention have particular advantages in electronic data storage systems. In one embodiment, the invention generally provides a method and apparatus for storing data to a disc drive, including determining 625 the data storing size of one or more free contiguous physical block addresses, then determining 630 the data size of a least one or more fragmented files, then 635 if the data storing size of at least one contiguous physical block addresses is at least as large as the data size of at least one of the fragmented files, then writing 685 at least one of the fragmented files to the contiguous physical block address where the total data size of the one or more fragmented files does not exceed the contiguous physical block address data storing size. In one aspect, if the data storing size for the at least one contiguous physical block address is at least as large as the total file size of at least two fragmented files then writing 685 the at least two fragmented files into the at least one contiguous physical block address. Additionally, in another aspect, prior to determining the data storing size of at least one contiguous physical block address, combining 645 the available physical block addresses into a minimum number of one or more contiguous physical block addresses. Further, where combining 645 the available physical block address into the at least one contiguous physical block address includes determining 622 the number of available physical block addresses, and combining 645 the available number of physical block addresses to form a minimum number of contiguous physical block addresses. In still another aspect, if the first fragmented file size is larger than the storing size of the at least one contiguous physical block address, providing a reserved physical block address having a data storing size sufficient to store the first fragmented file, then writing 655 the first fragmented file to the reserved physical block address. If the combined size of the available physical block addresses is at least the same size as the first fragmented file then combining 665 the available physical block addresses into at least a second contiguous physical block address sufficient in size to store the first fragmented file; and writing 685 the first fragmented file to the second contiguous physical block address.

In another embodiment, the invention provides a method of storing data to a disc drive including combining 645 at least two available physical block addresses into at least one contiguous physical block address, then locating 630 at least one fragmented file to the at least one contiguous physical block addresses wherein the data storing size of the contiguous physical block address is at least as large as the at least one fragmented file, then combining 685 the fragmented file to form at least one contiguous file, and writing 685 the at least one contiguous file to the at least one contiguous physical block address to form at least one contiguous defragmented file, where in one aspect, combining 645 the at least two available physical block addresses into at least one contiguous physical block address comprises moving 665 the files on the media 50 and positioning 665 the two available physical block address adjacent to each other. Additionally, where combining 685 the fragmented files to form at least one contiguous file includes writing 655 the fragmented file to a reserved area on the media 50 at least as large as the total file size of the fragmented file. Further, in another aspect, where writing 685 the at least one contiguous file to the at least one contiguous physical block address to form the at least one contiguous defragmented file includes writing 655 the fragmented file to a reserved area at least as large as the fragmented file, then combining 665 the available physical block addresses to form at least a second contiguous physical block address as large as the fragmented file, and writing 685 the file to the second contiguous physical block address. In a further aspect, where combining 645 the available physical block addresses to form at least a second contiguous physical block address as large as the fragmented file involves moving a plurality of data files on the media 50 so that the files are adjacent and forming the second contiguous physical block address. In one aspect the contiguous physical block addresses is located at about adjacent the reserved area. In another aspect, the reserved areas are located at about at least one or more outer cylinder. Still further, in another aspect, where the data size for the reserved area is user selectable.

In still another embodiment, the invention provides a disc drive system including a signal-bearing media 50 means for storing data, a code memory means 35 coupled to a read/write controller means for controlling the reading and writing of data to the signal-bearing media 50, means 40 for reading and writing the data to the signal-bearing media 50, and a processor means 34 coupled to the code memory 35 and the read/write controller for defragmenting the data on the signal-bearing media means 50. In one aspect, the processor means 34 includes a program which, when executed on the processor means 34, is configured to perform the steps of combining 645 at least two available physical block addresses into at least one contiguous physical block address, then locating 685 at least one fragmented file to the at least one contiguous physical block addresses where the data storing size of the contiguous physical block address is at least as large as the at least one fragmented file; and then combining the fragmented file to form at least one contiguous file, and writing 685 the at least one contiguous file to the at least one contiguous physical block address to form at least one contiguous defragmented file. In another aspect, combining the at least two available physical block addresses into at least one contiguous physical block address involves moving the files on the media 50 and positioning the two available physical block address adjacent. Additionally, in another aspect, writing 685 the at least one contiguous file to the at least one contiguous physical block address to form the at least one contiguous defragmented file includes writing 655 the fragmented file to a reserved area at least as large as the fragmented file, then combining 660 the available physical block addresses to form at least a second contiguous physical block address as large as the fragmented file, and writing 685 the file to the second contiguous physical block address. In another aspect, combining 665 the available physical block addresses to form at least a second contiguous physical block address as large as the fragmented files involves moving a plurality of data files on the media 50 so that the files are adjacent and forming the second contiguous physical block address. In another aspect, the contiguous physical block address is located at about adjacent the reserved area.

While foregoing is directed to the various embodiment of the invention, other and further embodiments of the invention may be devised without departing from the basic scope thereof, and the scope thereof is determined by the claims that follow.

What is claimed is:

1. A method of storing data to a disc drive, comprising:
   determining the data storing size of one or more free contiguous physical block addresses;
   determining the data size of a least one or more fragmented files;
   if the data storing size of at least one contiguous physical block addresses is at least as large as the data size of at least one of the fragmented files; then
   writing at least one of the fragmented files to the contiguous physical block address, and wherein the total data size of the one or more fragmented files does not exceed the contiguous physical block address data storing size; and
   if the data storing size for the at least one contiguous physical block address is at least as large as the total file size of at least two fragmented files; then
   writing the at least two fragmented files into the at least one contiguous physical block address.

2. The method of claim 1, further comprising prior to determining the data storing size of at least one contiguous physical block address combining the available physical block addresses into a minimum number of one or more contiguous physical block addresses.

3. The method of claim 2, wherein combining the available physical block address into the at least one contiguous physical block address comprises:
   determining the number of available physical block addresses; and
   combining the available number of physical block addresses to form contiguous physical block addresses.

4. The method of claim 1, wherein if the first fragmented file size is larger than the storing size of the at least one contiguous physical block address:
   providing a reserved physical block address having a data storing size sufficient to store the first fragmented file;
   writing the first fragmented file to the reserved physical block address; if the combined size of the available physical block addresses is at least the same size as the first fragmented file;
   combining the available physical block addresses into at least a second contiguous physical block address sufficient in size to store the first fragmented file; and
   writing the first fragmented file to the second contiguous physical block address.

5. A method of storing data to a disc drive, comprising:
   combining at least two available physical block addresses into at least one contiguous physical block address;
   locating at least one fragmented file to the at least one contiguous physical block addresses wherein the data storing size of the contiguous physical block address is at least as large as the at least one fragmented file;
   combining the fragmented file to form at least one contiguous file; and
   writing the at least one contiguous file to the at least one contiguous physical block address to form at least one contiguous defragmented file.

6. The method of claim 5, wherein combining the at least two available physical block addresses into at least one contiguous physical block address comprises moving the files on the media and positioning the two available physical block address adjacent to each other.

7. The method of claim 5, wherein combining the fragmented files to form at least one contiguous file comprises writing the fragmented file to a reserved area on the media at least as large as the total file size of the fragmented file.

8. The method of claim 5, wherein writing the at least one contiguous file to the at least one contiguous physical block address to form the at least one contiguous defragmented file comprises:
   writing the fragmented file to a reserved area at least as large as the fragmented file;
   combining the available physical block addresses to form at least a second contiguous physical block address as large as the fragmented file; and
   writing the file to the second contiguous physical block address.

9. The method of claim 8, wherein combining the available physical block addresses to form at least a second contiguous physical block address as large as the fragmented file comprises moving a plurality of data files on the media so that the files are adjacent and forming the second contiguous physical block address.

10. The method of claim 5, wherein the contiguous physical block address is located substantially adjacent the reserved area.

11. The method of claim 10, wherein the reserved area is located substantially adjacent at least one or more outer cylinders.

12. The method of claim 10, wherein a data size for the reserved area is user selectable.

13. A disc drive system comprising:
    signal-bearing media means for storing data;
    code memory means coupled to a read/write controller means for controlling the reading and writing of data to the signal-bearing media;
    means for reading and writing the data to the signal-bearing media; and
    processor means coupled to the code memory and the read/write controller for defragmenting the data on the signal-bearing media means;
    wherein the processor means comprises a program which, when executed on the processor means, is configured to perform the steps comprising
    combining at least two available physical block addresses into at least one contiguous physical block address,
    locating at least one fragmented file to the at least one contiguous physical block addresses wherein the data storing size of the contiguous physical block address is at least as large as the at least one fragmented file,
    combining the fragmented file to form at least one contiguous file, and
    writing the at least one contiguous file to the at least one contiguous physical block address to form at least one contiguous defragmented file.

14. The system of claim 13, wherein combining the at least two available physical block addresses into at least one contiguous physical block address comprises moving the files on the media and positioning the two available physical block address adjacent.

15. The system of claim 13, wherein combining the fragmented files to form at least one contiguous file comprises writing the fragmented file to a reserved area on the media at least as large as the total file size of the fragmented files.

16. The system of claim 13, wherein writing the at least one contiguous file to the at least one contiguous physical block address to form the at least one contiguous defragmented file comprises:

writing the fragmented file to a reserved area at least as large as the fragmented file;

combining the available physical block addresses to form at least a second contiguous physical block address as large as the fragmented file; and writing the file to the second contiguous physical block address.

17. The system of claim 16, wherein combining the available physical block addresses to form at least a second contiguous physical block address as large as the fragmented files comprises moving a plurality of data files on the media so that the files are adjacent and forming the second contiguous physical block address.

18. The system of claim 13, wherein the contiguous physical block address is located substantially adjacent the reserved area.

* * * * *